UNITED STATES PATENT OFFICE.

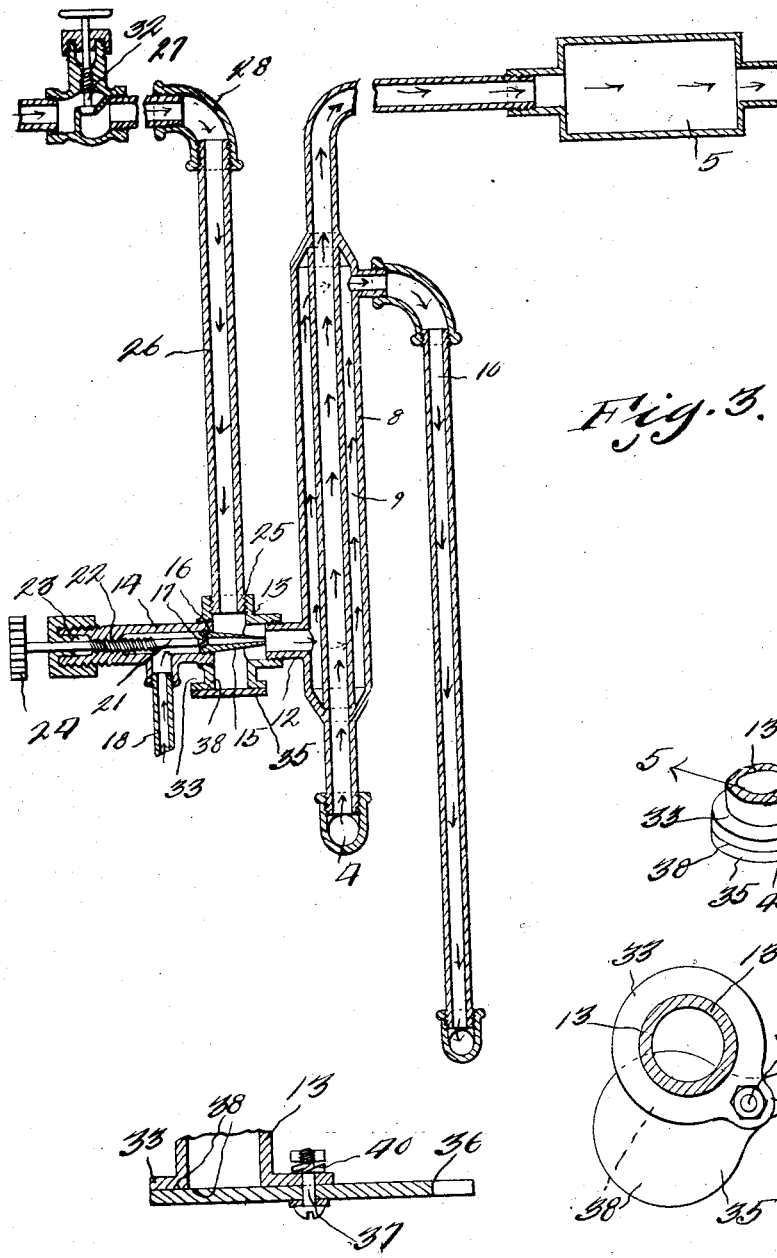

JOHN WILLENBRING, OF RICHMOND, MINNESOTA.

DEVICE FOR UTILIZING KEROSENE FOR GASOLENE-ENGINES.

1,274,125.     Specification of Letters Patent.     Patented July 30, 1918.

Application filed July 21, 1916. Serial No. 110,547.

*To all whom it may concern:*

Be it known that I, JOHN WILLENBRING, a citizen of the United States, residing at Richmond, in the county of Stearns, State of Minnesota, have invented a new and useful Device for Utilizing Kerosene for Gasolene-Engines; and I do hereby declare the following to be a full, clear, and exact description of the invention, such as will enable others skilled in the art to which it appertains to make and use the same.

This invention relates to an improved device for utilizing kerosene as a substitute for, or as an auxiliary to gasolene, for running an internal combustion engine.

As an object of the invention it is the aim to provide a device of this kind carried by the exhaust manifold, tapped into the side of the carbureter and having a connection with the water jacket of the engine, whereby a mixture of kerosene, air and steam may be heated by the exhaust manifold so as to volatilize the mixture, thereby producing a highly efficient charge, which enters the carbureter, where it is carbureted, and then drawn into the combustion chamber of the engine, responsive to the impulses of the piston.

A further object of the invention is the provision of a ground plate valve including a spring for holding it closely seated, said valve acting when manipulated to control the intake of air into a casing into which kerosene is fed.

A further object of the invention is the provision of a device of this kind having connections with the water jacket of the engines, whereby steam from the water jacket may be carried to and mixed with the mixture of kerosene and air.

In practical fields, the details of construction may necessitate alterations falling within the scope of what is claimed.

The invention comprises further features and combination of parts, as hereinafter set forth, shown in the drawings and claimed.

In the drawings:—

Fig. 3 is a sectional view through the improved device for mixing and injecting a mixture of air, steam and kerosene into the carbureter.

Fig. 4 is a detail perspective view of a plate valve for controlling the intake of air into the mixture of steam and kerosene.

Fig. 5 is a sectional view on line 5—5 of Fig. 4.

Fig. 6 is a plan view of the valve shown in Fig. 4, showing the same open.

Figure 1:
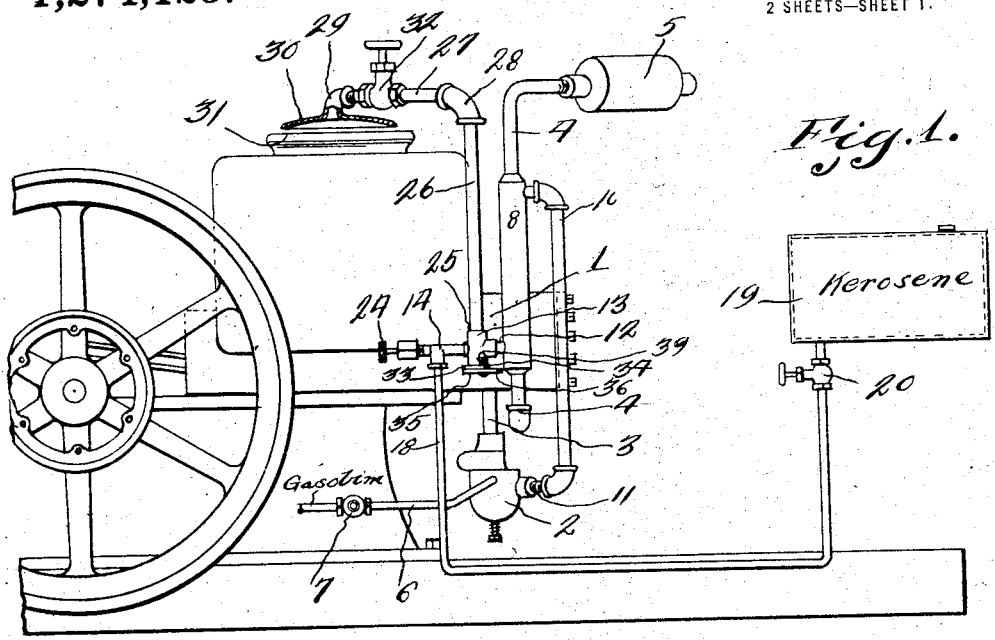
Figure 1 is a view in side elevation of an internal combustion engine, illustrating the improved device for using kerosene mixed with air and steam as a fuel for injection into the carbureter.
Figure 2:
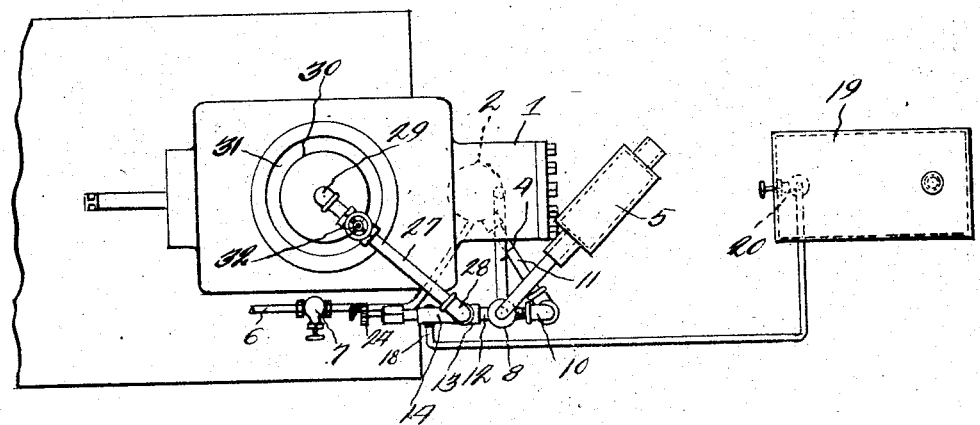
Fig. 2 is a plan view.

Referring more especially to the drawings, 1 designates the cylinder of the engine, and 2 the carbureter, which is connected to the cylinder by the pipe 3, and 4 denotes an exhaust pipe leading from the under part of the cylinder, the extremity of which is provided with the usual muffler 5. A gasolene supply pipe 6, leading from any suitable source of supply (not shown) and provided with a valve 7 for controlling the gasolene, is connected to the carbureter. A casing 8 forms a part of and surrounds the exhaust manifold pipe 4, thereby providing a mixing chamber 9 for the kerosene. By means of the pipe 10 (which is connected to the nipple 11 of the carbureter) the upper part of the mixing chamber 9 and the carbureting chamber of the carbureter are in communication. Threaded to a lateral extension 12 of the lower part of the casing 8 is a casing 13, and threaded thereinto diametrically opposite to and axially with the extension 12, is a tube 14. Threaded into the inner end of the tube 14 is a tapering nozzle 15 having a valve seat 16, with which the needle valve 17 coöperates, for controlling the kerosene, which enters the tube 14 through the pipe 18, which connects with a suitable kerosene supply tank 19, there being a suitable valve 20 for controlling the supply of kerosene. The stem 21 is threaded at 22 into the tube 14, and operates through the packing gland 23, and is provided with a hand wheel 24. Also threaded into the casing 13, as shown at 25, is a pipe or tube 26, which connects to the pipe or tube 27 by means of the elbow 28. The extremity of the pipe 27 has an elbow 29 provided with an annular plate 30, which is dished upwardly, and is suspended over the opening 31 of the usual water jacket of the casing of the engine, so that steam from the water jacket may enter the pipes 27 and 26 into the casing 13, so as to mix with the kerosene in the chamber 9, or mix with the kerosene as it enters the chamber 9. A suitable valve 32 is mounted in the pipe 27 for controlling the supply of steam. The lower end of the casing 13 is open and is provided with an annular flange 33 having a lateral ear 34, to which a circular plate 35 having a handle 36 is pivoted by means of a bolt 37. The adjacent faces 38 of the flange 33 and the plate 35 are ground, to insure a ground joint, and interposed between the nut 39 of the bolt 37 and the upper face of the ear 34 is a spring split ring 40, acting to hold the plate valve 35 closely in contact with the under surface of the flange 33. The plate valve 35, by operating the handle 36, may be opened, to permit the requisite amount of air proportionately to the steam and kerosene, to enter the casing 13. When first starting the engine the charges are drawn from the carbureter responsive to the impulses of the piston of the engine, using gasolene as the fuel. After the engine responds and is under way, the supply of gasolene is cut off by closing the valve 7, then the valves 20 and 32 and the plate valve 35 are opened, as required, so that the combination of kerosene, steam and air may be used as the fuel, the needle valve 17 first having been opened to allow the necessary quantity of kerosene to be injected into the chamber 9, where it mixes with the steam and air and is volatilized by the heat from the exhaust manifold pipe 4. This preheated, or volatilized mixture passes through the pipe 10 and into the carbureter, where it is carbureted or carburized and then drawn into the combustion chamber of the engine incident to the impulses of the piston.

The invention having been set forth, what is claimed as new and useful is:—

1. In a device for utilizing kerosene for internal combustion engines, the combination of the exhaust manifold and a casing surrounding the same, of a mixing and volatilizing chamber in the casing, a carbureter, means of communication between the upper part of the chamber and the carbureting chamber of the carbureter, and means for projecting steam, air and kerosene into said chamber, said last named means comprising a casing having a chamber for the mixture of steam and air and having communication with the mixing and volatilizing chamber, and provided with a nozzle for injecting kerosene into the mixing and volatilizing chamber, said nozzle having a valve seat, said nozzle having means of communication with the kerosene supply, a needle valve coöperating with the seat to control the kerosene, said last named casing having a valve controlled air intake and provided with a pipe including a valve adapted to be connected to the water jacket of the engine for conveying steam into said last named casing.

2. In a device for utilizing kerosene for internal combustion engines, the combination with an exhaust manifold, of an elongated tubular casing surrounding and integral with the same and having a mixing and volatilizing chamber extending longitudinally thereof, a carbureter, a pipe of communication between the upper part of said chamber and the carbureting chamber of the carbureter, a second casing provided with a chamber for the mixture of air and steam therein, means for introducing kerosene into the mixture of air and steam, a passage of communication between the volatilizing chamber and the air and steam mixing chamber at a point very close to the lower end of the volatilizing chamber, whereby the kerosene is drawn into the volatilizing chamber by the steam and air so that the heat from the exhaust manifold will act to volatilize the mixture of kerosene, steam and air by the time it reaches the pipe of communication with the carbureter, the second casing having a nozzle extending across the air and steam mixing chamber for injecting kerosene into the passage between the two chambers, the second casing having diametrically oppositely disposed steam passage and air intake port on opposite sides of said nozzle, whereby the mixture of air and steam may be drawn into the volatilizing chamber by the injection of kerosene to said passage, a valve to control the steam passage, a pivoted plate valve to control the air through said port, spring means to hold the plate valve closely to its seat, and a needle valve for controlling kerosene through said nozzle.

In testimony whereof I have signed my name to this specification in the presence of two subscribing witnesses.

JOHN WILLENBRING.

Witnesses:
ANTON B. RIELAND,
HENRY FLINT.